United States Patent [19]

Nakamura et al.

[11] Patent Number: 4,598,730

[45] Date of Patent: Jul. 8, 1986

[54] FLOW CONTROL VALVE

[75] Inventors: Akira Nakamura, Tokyo; Shunji Asao; Yoshiyuki Ito, both of Sagamihara, all of Japan

[73] Assignee: Caterpillar Mitsubishi Ltd., Tokyo, Japan

[21] Appl. No.: 644,213

[22] Filed: Aug. 24, 1984

[30] Foreign Application Priority Data

Aug. 29, 1983 [JP] Japan .......................... 58-133320[U]

[51] Int. Cl.⁴ .............................................. F16K 17/22
[52] U.S. Cl. ...................................... 137/117; 137/491
[58] Field of Search ................................ 137/117, 491

[56] References Cited

U.S. PATENT DOCUMENTS

| 3,815,627 | 6/1974 | Farrell | 137/491 |
| 4,343,324 | 8/1982 | Ohe | 137/117 |
| 4,396,033 | 8/1983 | Narumi | 137/117 |

Primary Examiner—Alan Cohan
Attorney, Agent, or Firm—Robert E. Burns; Emmanuel J. Lobato; Bruce L. Adams

[57] ABSTRACT

A flow control valve comprising spool means and overload relief valve means built in the spool means. A filter is disposed on the upstream side of the relief valve means. When a hydraulic oil is passed through the filter, foreign materials are removed from the oil and the pulsation of the oil is inhibited or eliminated.

17 Claims, 1 Drawing Figure

FLOW CONTROL VALVE

FIELD OF THE INVENTION

This invention relates to a flow control valve for use in a hydraulic system, and more specifically, to a flow control valve equipped with an overload relief valve means.

DESCRIPTION OF THE PRIOR ART

A fixed displacement pump which is simpler in structure and less expensive than a variable displacement pump is generally used as an oil supply source for hydraulic systems of construction machinery, etc. The amount of pumping of the fixed displacement pump varies considerably according to its rotating speed, and therefore the rotating speed of a driving source. It is important therefore to dispose between the fixed displacement pump and an actuator, such as a hydraulic cylinder, a flow control valve which compensates for the variations in the amount of pumping of the fixed displacement pump. It is also important that the hydraulic systems of construction machinery, etc. should also be equipped with means for relieving overload. Generally, therefore, a flow control valve equipped with an overload relief valve means is disposed between the fixed displacement pump and the actuator in the hydraulic systems of the construction machinery and the like.

A valve of the type comprising spool means for compensating for the variations in the amount of pumping of a fixed displacement pump and uniformizing the flow rate of an oil to be fed to the actuator and an overload relief valve means built in the spool means is conveniently used as the flow control valve equipped with an overload relief valve means. Generally, the oveload relief valve means is of the poppet type.

The conventional flow control valve of the above type equipped with an overload relief valve means has the following problems or defects to be solved or eliminated.

Firstly, construction machinery or the like is frequently used in a polluted atmosphere containing sand, dust, etc., and it is not uncommon that foreign materials such as sand and dust get mixed with the hydraulic oil used in the hudraulic systems. If the oil containing such foreign materials flows through the open overload relief vlave means, the foreign materials adhere to the constituent elements of the relief valve means such as a valve seat member and a poppet. Consequently, the relief pressure of the overload relief valve means is varied, and the relieving action becomes unstable. It is necessary therefore to remove the spool means having the built-in overload relief valve means at regular intervals for disassembling and cleaning.

Secondly, the oil flowing through the open overload relief valve means frequently pulsates. In such a case, the movable constituent element such as the poppet of the overload relief valve means undergoes vibration by the pulsating flow of the hydraulic oil, and therefore, the relieving action of the valve means becomes unstable.

SUMMARY OF THE INVENTION

It is a primary object of this invention, therefore, to provide an improved flow control valve equipped with an overload relief valve means in which the relieving action is performed stably under a predetermined relief pressure.

Another object of this invention is to provide an improved flow control valve equipped with an overload relief valve means, which obviates the need for disassembling and cleaning the spool means having a built-in overload relief valve means, and enables the required relieving action to be performed by very simple part replacement or cleaning.

The present inventors made extensive research and experimental works and have found that when a filter is provided to cover the upstream end of a relief passage formed in the spool means, the hydraulic oil flowing into the relief passage goes through the filter which removes the foreign materials in the oil so that the adhesion of the foreign materials to the constituent elements of the overload relief valve means can be surely prevented, and that when the hydraulic oil flowing into the relief passage passes through the filter, its pulsation is inhibited or eliminated.

Thus, according to this invention, there is provided a flow control valve comprising a valve body, a bore formed in the valve body with at least one end being open, plug means detachably mounted on said one end of the bore for closing said one end, spool means slidably received in the bore, one side of the spool means within the bore defining a first oil chamber, the other side thereof within the bore defining a second oil chamber, and the intermediate surrounding part of the spool means defining a drain chamber, limiting means for limiting the movement of the spool means toward the first oil chamber to a predetermined position, differential pressure prescribing spring means for elastically biasing the spool means toward the first oil chamber, an inlet passage formed in the valve body extending from an oil inlet opening to the first oil chamber, an outlet passage formed in the valve body extending from the first oil chamber toward an oil outlet opening and including a differential pressure generating orifice, a differential pressure passage formed in the valve body extending from that part of the outlet passage which is downstream of the differential pressure generating orifice to the second oil chamber, a drain passage formed in the valve body extending from the drain chamber to a drain opening, a relief passage formed in the spool means for communicating the second oil chamber with the drain chamber, overload relief valve means disposed in the relief passage, the spool means being adapted to be moved toward said one end of the bore against the elastic biasing action of the differential pressure prescribing spring means when the difference between the pressure of the oil in the first oil chamber and that of the oil in the second oil chamber exceeds a predetermined amount, whereby the first oil chamber is caused to communicate with the drain chamber, the relief valve means being adapted to be opened when the pressure of the oil in the second oil chamber exceeds a predetermined relief value, whereby the second oil chamber is caused to communicate with the drain chamber through the relief passage, and a filter for covering the upstream end of the relief passage.

Other objects of this invention will become apparent from the following detailed description given with reference to the accompanying drawings.

DETAILED DESCRIPTION OF PREFERRED EMBODIMENTS

Figure 1:
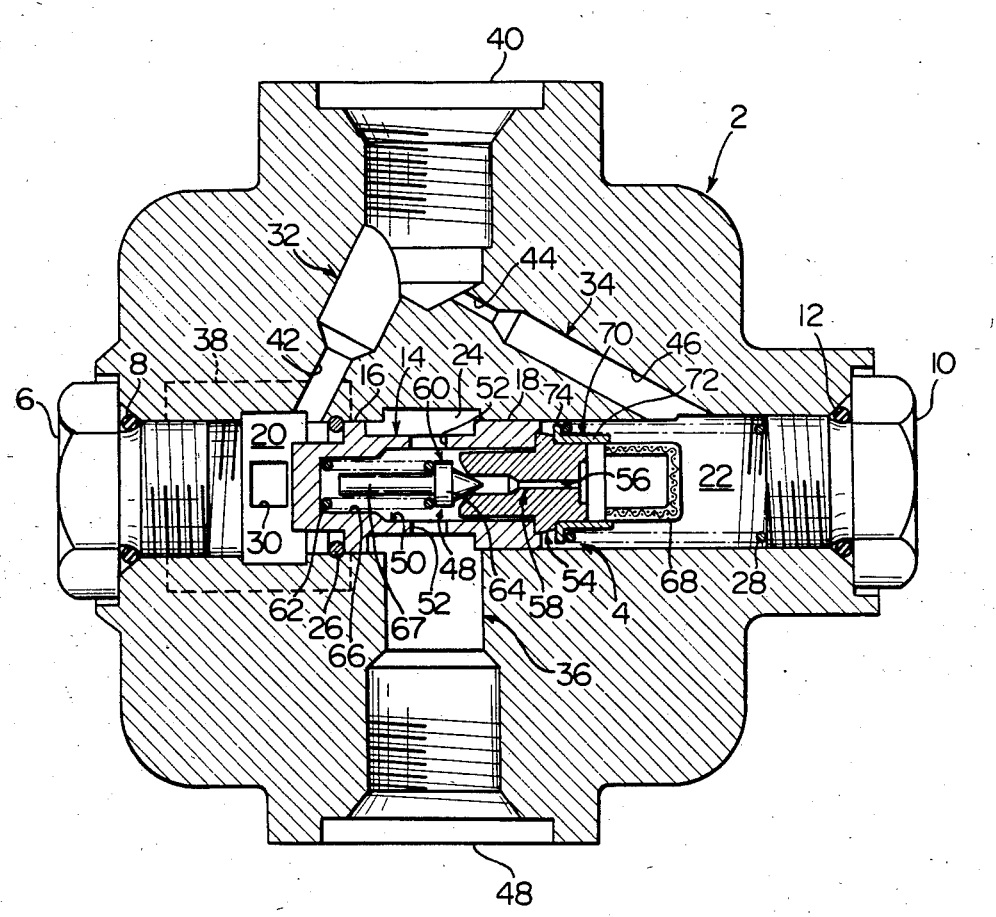
FIG. 1 is a sectional view showing one embodiment of the flow control valve constructed in accordance with this invention.

With reference to the accompanying drawings, specific embodiments of the flow control valve equipped with an overload relief valve means constructed in accordance with this invention will be described in detail.

With reference to FIG. 1, the flow control valve shown has a valve body 2 which may be nearly rectangular. A bore 4 extending in the left-right direction in FIG. 1 is formed in the valve body 2. Preferably, the bore 4 extends through the valve body 2, and therefore opens at the left surface of the valve body 2 at one end and at the right surface of the valve body 2 at the other end. An internal thread is formed on the inside surface of one end portion of the bore 4, and a nut-type plug means 6 is screwably received by the one end portion. Thus, one end of the bore 4 is closed. A seal ring 8 is disposed between one end portion of the bore 4 and the plug means 6. Likewise, an internal thread is formed on the inner surface of the other end portion of the bore 4, and a nut-type plug means 10 is screwably received by the other end portion. Thus, the other end of the bore 4 is closed. A seal ring 12 is disposed between the other end portion of the bore 4 and the plug means 10.

Spool means 14 in the form of a valve spool is slidably received in the bore 4. Two lands 16 and 18 spaced from each other in the longitudinal direction (i.e., the left-right direction in FIG. 1) are formed on the peripheral surface of the spool means 14. Thus, the inside of the bore 4 is divided into a first oil chamber 20 defined on the left side of the spool means 14, or more specifically on the left of the land 16, a second oil chamber 22 defined on the right side of the spool means 14, or more specifically on the right of the land 18, and a drain chamber 24 defined between the land 16 and the land 18. The inside diameter of the drain chamber 24 is made greater than the outside diameters of the lands 16 and 18 over a predetermined range in the longitudinal direction. A stop ring 26 adjacent to the left side of the land 16 is fixed to the inner circumferential surface of the bore 4. Upon the abutment of the land 16 against the stop ring 26, the movement of the spool means 14 to the left in FIG. 1 is limited to the position shown in FIG. 1. On the other hand, a differential pressure prescribing spring, i.e. a compression oil spring 28, is interposed between the spool means 14 and the plug means 10. The coil spring 28 elastically or resiliently biases the spool means 14 to the left in FIG. 1 and holds it elastically at the position shown in FIG. 1 (the relation between the coil spring 28 and the spool means 14 will be described hereinafter).

An influent or inlet passage 30, an effluent outlet passage 32, a differential pressure passage or branch passage 34 and a drain passage 36 are further formed in the valve body 2. The influent passage 30 extends from the first oil chamber 20 to an oil influent opening 38 opened to the rear surface of the valve body 2. The effluent passage 32 extends from the first oil chamber to an oil effluent opening 40 opened to the upper surface of the valve body 2. The effluent passage 32 includes a differential pressure generating orifice 42 which is disposed in the upstream end portion of the effluent passage 32 and has a relatively small diameter. The differential pressure passage 34 extends from that part of the effluent passage 32 which is downstream of the differential pressure generating orifice 42 to the second oil chamber 22. The differential pressure passage 34 has an upstream portion 44 having a relatively small diameter and a downstream portion 46 having a relatively large diameter. The drain passage 36 extends from the drain chamber 24 to a drain opening 48 opened to the undersurface of the valve body 2.

On the other hand, a relief passage for bringing the second oil chamber 22 into communication with the drain chamber 24 is formed in the spool means 14, and an overload relief valve means 48 is disposed in the relief passage. In the illustrated embodiment, a longitudinal hole 50 is formed in the spool means 14 extending from its right end toward the left over a predetermined length. Furthermore, a plurality of radial holes 52 extending radially and connecting the longitudinal hole 50 to the drain chamber 24 are formed. The longitudinal hole 50 and the radial holes 52 constitute the relief passage. The overload relief valve means 48 is constructed of a poppet-type relief valve disposed in the longitudinal hole 50. More specifically, an internal thread is formed on the inner circumferential surface of the open end portion (i.e., the right end portion) of the longitudinal hole 50, and a valve seat member 54 is received in the open end portion. The valve seat member 54 has formed therein a longitudinal through-hole 58 including a portion 56 having a sufficiently small cross-sectional area of, for example, about 0.3 to about 0.5 mm². On the left of the valve seat member 54 are disposed a poppet 60 and a compression coil spring 62. The coil spring 62 is disposed between the bottom surface of the longitudinal hole 50 and an annular flange portion 64 of the poppet 60. The poppet 60 is elastically biased to the right to press its tip against the valve seat member 54 under a predetermined relief pressure and thus the through-hole 58 formed in the valve seat member 54 is closed. The rear end portion 66 of the longitudinal hole 50 is made slightly smaller in diameter than the other portions, and is substantially the same as the outside diameter of the coil spring 62. The outside diameter of a shaft portion 67 of the poppet 60 is made substantially the same at that of the coil spring 62. Thus, the vibration of the coil spring 62 in the radial direction is inhibited as a result of being restrained by the longitudinal rear end portion 66 and the vibration of the poppet 60 in the radial direction is inhibited as a result of being restrained by the coil spring 62.

It is critical that in the flow control valve constructed in accordance with this invention, a filter 68 is provided which covers the upstream end of the relief passage, and therefore the upstream end of the through-hole 58 formed in the valve seat member 54. Preferably, the filter 68 is disposed between the coil spring 28 and the spool means 14 so that it is maintained in a predetermined relation relative to the spool means 14 by the elastic biasing action of the coil spring 28. In the illustrated embodiment, retaining means in the form of a spring receiving member 70 is mounted on the front end portion, i.e. the left end portion, of the coil spring 28 for retaining the coil spring 28 in a predetermined relation relative to the spool means 14. The spring receiving member 70 has a cylindrical portion 72 and an outside annular flange portion 74 protruding radially outwardly from the front end of the cylindrical portion 72. The outside diameter of the cylindrical portion is substantially the same as, or slightly greater than, the inside diameter of the coil spring 28. The spring receiving member 70 is mounted on the coil spring 28 by forcedly inserting the cylindrical portion 72 into the coil spring 28 until the rear surface of the the outside annular flange portion 74 makes contact with the front end of the coil spring 28. As a result, the spring receiving member 70 is elastically held at the front end portion of the coil spring 28. The filter 68 is cup-shaped, and the outside surface of its open end portion is fixed to the inner surface of the cylindrical portion 72 of the spring receiving member 70 by a suitable method, for example by welding or bonding. The filter 68 may be formed of such a material as a multilayer wire gauze having a rated filtration of 150 to 200 $\mu$m. The elastic biasing action of the coil spring 28 urges the spring receiving member 70 into abutment against the valve seat member 54 fixed to the spool means 14, and the filter 68 is maintained in a predetermined relation to the valve seat member 54.

The operation of the flow control valve described hereinabove will now be described.

The oil influent opening 38 is connected to an exhaust port of a fixed displacement pump (not shown) through a suitable pipeline, and the oil effluent opening 40 is connected to an actuator (not shown) such as a hydraulic cylinder through a suitable pipeline. The drain opening 48 is connected to a reservoir (not shown) through a suitable pipeline. As pressurized result, a hydraulic oil discharged from the fixed displacement pump flows into the first oil chamber 20 through the influent passage 30, and then to the actuator through the effluent passage 32. When the rotating speed of the fixed displacement pump increases and therefore the flow rate of the oil discharged from the fixed displacement pump increases, the flow rate of the oil passing through the effluent passage 32 increases. As a result, the pressure drop increases across the differential pressure generating orifice 42 of the effluent passage 32, and therefore, the differential pressure ($\Delta P = P1 - P2$) between the pressure (P1) of the oil in the first oil chamber 20 and the pressure (P2) of the oil in the second oil chamber 22 increases. When the differential pressure ($\Delta P = P1 - P2$) exceeds a predetermined value set by the differential pressure prescribing coil spring 28, the differential pressure causes the spool means 14 to move to the right in FIG. 1 against the elastic biasing action of the coil spring 28. Consequently, the land 16 of the spool means 14 is moved to the drain chamber 24 and the first oil chamber 20 communicates with the drain chamber 24. Hence, the excess of the oil which has flowed into the first oil chamber 20 from the fixed displacement pump flows into the drain chamber 24, and from the drain chamber 24, is returned to the reservoir through the drain passage 36. The flow rate of the oil fed to the actuator is therefore maintained at a predetermined value.

On the other hand, when the pressure on the actuator increases, the pressure P2 of the oil in the second oil chamber 22 increases because the second oil chamber 22 communicates with the actuator through the effluent passage 32 and the differential pressure or branch passage 34. When the oil pressure P2 of the second oil chamber 22 exceeds the relief pressure defined by the coil spring 62 of the overload relief valve means 48, the poppet 60 is moved to the left in FIG. 1 against the elastic biasing action of the coil spring 62, and the relief valve means 48 is opened. As a result, the oil is returned to the reservoir from the second oil chamber 22 via the relief valve means 48, the drain chamber 24 and the drain passage 36, and the overload is thus relieved.

The flow control valve constructed in accordance with this invention has the filter 68 described above, and the hydraulic oil flowing into the relief valve means 48 goes through the filter 68. Accordingly, any foreign materials such as sand and dust which may be present in the oil are removed from it through the filter 68. It is possible, therefore, to prevent the adhesion of the foreign materials to the valve seat member 54 and the poppet 60 of the relief valve means 48 and thus eliminate the consequent adverse effects on the action of the relief valve means 48. Furthermore, as a result of the oil passing through the filter 68, its pulsation is inhibited or eliminated. It is possible, therefore, to avoid the unstable relieving action of the relief valve means 48 ascribed to the pulsation of the oil. The inhibition and elimination of gthe pulsation of the oil are also facilitated by the passing of the oil through the portion 56 of a sufficiently small cross-sectional area in the through-hole 58 formed in the valve seat member 54.

When the filter 68 is blocked up after long use, the plug means 10 is detached, and the coil spring 28 and the spring receiving member 70 and the filter 68 mounted thereon are taken out. The filter 68 is washed, or the filter 68 or both the filter 68 and the spring receiving member 70 are replaced with new ones.

While the flow control valve constructed in accordance with this invention has been described in detail hereinabove with reference to its specific embodiments shown in the accompanying drawings, it should be understood that the present invention is not limited to such specific embodiments and various changes and modifications are possible without departing from the scope of the invention.

What is claimed is:

1. A flow control valve comprising:
   a valve body,
   a bore formed in the valve body with at least one end being open,
   plug means detachably mounted on said one end of the bore for closing said one end,
   spool means slidably received in the bore, one side of the spool means within the bore defining a first oil chamber, the other side thereof within the bore defining a second oil chamber, and the intermediate surrounding part of the spool means defining a drain chamber,
   limiting means for limiting the movement of the spool means toward the first oil chamber to a predetermined position,
   differential pressure prescribing spring means for eleastically biasing the spool means toward the first oil chamber,
   an influent passage formed in the valve body extending from an oil influent opening to the first oil chamber,
   an effluent passage formed in the valve body extending from the first oil chamber toward an oil effluent opening and including a differential pressure generating orifice, a differential pressure passage formed in the valve body extending from that part of the effluent passage which is downstream of the differential pressure generating orifice to the second oil chamber, a drain passage formed in the valve body extending from the drain chamber to a drain opening, a relief passage formed in the spool means for communicating the second oil chamber with the drain chamber, overload relief valve means disposed in the relief passage, the spool means being movable toward said one end of the bore against the elastic biasing action of the differential pressure prescribing spring means when the difference between the pressure of the oil in the first oil chamber and that of the oil in the second oil chamber exceeds a predetermined amount, whereby the first oil chamber is caused to communicate with the drain chamber, the relief valve means being openable when the pressure of the oil in the second oil chamber exceeds a predetermined relief value, whereby the second oil chamber is caused to communicate with the drain chamber through the relief passage, and a filter for covering the upstream end of the relief passage, the filter being disposed between the differential pressure prescribing spring means and the spool means and being maintained in a predetermined relation to the spool means by the elastic biasing action of the differential pressure prescribing means.

2. The flow control valve of claim 1 wherein the other end of the bore is also opened, and the flow control valve also includes plug means detachably mounted on the other end of the bore to close said other end.

3. The flow control valve of claim 1 wherein
the relief passage is composed of a longitudinal hole extending longitudinally in the spool means from its open end and opening into the second oil chamber, and at least one radial hole extending radially from said longitudinal hole, and the relief means is comprised of a valve seat member mounted on the open end portion of the longitudinal hole and having a longitudinal passage formed therein, a poppet received in the longitudinal hole for free movement therein in the longitudinal direction, and relief pressure prescribing spring means for pressing the poppet elastically against the valve seat member.

4. The flow control valve of claim 3 wherein at least a part of the longitudinal through-hole formed in the valve seat member has a cross-sectional area sufficiently small for inhibiting the pulsation of a hydraulic oil flowing therethrough.

5. The flow control valve of claim 1 wherein
the differential pressure prescribing spring means is composed of a coil spring interposed between the plug means and the spool means, and a spring receiving member abutting against the spool means at the front end portion of the coil spring, the filter being mounted on the spring receiving member.

6. The flow control valve of claim 5 wherein the spring receiving member has a cylindrical portion inserted forcibly into the coil spring and an outside annular flange portion which protrudes radially outwardly from the rear end of the cylindrical portion and whose rear surface contacts the front end of the coil spring, and the filter has a cup-shape whose open end portion is fixed at its outside surface of the inner surface of the cylindrical portion.

7. The flow control valve of claim 1 wherein the filter is formed of a multilayer wire gauze.

8. A flow control valve comprising: a valve body containing a bore; a valve spool slidably dispoed within the bore and defining therewith a first oil chamber at one end of the valve spool, a second oil chamber at the other end of the valve spool, and a drain chamber intermediate the first and second oil chambers; an inlet passage in the valve body communicating an oil inlet opening with the first oil chamber for admitting pressurized oil to the first oil chamber during use of the flow control valve; an outlet passage in the valve body communicating the first oil chamber with an outlet opening for flowing the pressurized oil through the outlet opening; a branch passage in the valve body communicating the outlet passage with the second oil chamber for flowing some of the pressurized oil to the second oil chamber; a drain passage in the valve body communicating the drain chamber with a drain opening for flowing oil from the drain chamber through the drain opening; biasing means for resiliently biasing the valve spool in one direction toward the first oil chamber so that the valve spool blocks communication between the first oil chamber and the drain chamber; means for creating a pressure difference between the oil pressures in the first and second oil chambers and applying the pressure difference across the valve spool to effect sliding movement thereof in the other direction toward the second oil chamber when the pressure difference exceeds a given value to thereby provide communication between the first oil chamber and the drain chamber; relief valve means carried by the valve spool for communicating the second oil chamber with the drain chamber when the oil pressure in the second oil chamber exceeds a certain value; and filtering means for filtering the oil flowing from the second oil chamber through the relief valve means to the drain chamber, the filtering means being interposed between the valve spool and the biasing means and being maintained in a predetermined relation relative to the valve spool by the biasing action of the biasing means.

9. A flow control valve according to claim 8; including retaining means removably attached to the valve spool at one end thereof for retaining the biasing means in a predetermined relation relative to the valve spool, and means connecting the filtering means to the retaining means so that the retaining means and filtering means can be removed together as a unit.

10. A flow control valve according to claim 9; wherein the retaining means has a cylindrical portion terminating at one end in an annular flange; and the biasing means comprises a coil spring forcibly inserted over the cylindrical portion and seated on the annular flange.

11. A flow control valve according to claim 10; wherein the means connecting the filtering means to the retaining means comprises means connecting the filtering means to the inner periphery of the cylindrical portion of the retaining means.

12. A flow control valve according to claim 10; wherein the relief valve means comprises a valve seat member connected to one end of the valve spool and having a through-hole extending therethrough communicating the second oil chamber with an opening in the interior of the valve spool, means communicating the valve spool opening with the drain chamber, and a spring-biased valve element seated on the valve seat member.

13. A flow control valve according to claim 12; including means removably attaching the retaining means to the valve seat member.

14. A flow control valve according to claim 13; wherein the valve element comprises a poppet.

15. A flow control valve according to claim 8; wherein the relief valve means comprises a valve seat member connected to one end of the valve spool and having a through-hole extending therethrough communicating the second oil chamber with an opening in the interior of the valve spool, means communicating the valve spool opening with the drain chamber, and a spring-biased valve element seated on the valve seat member.

16. A flow control valve according to claim 15; including means removably attaching the retaining means to the valve seat member.

17. A flow control valve according to claim 16; wherein the valve element comprises a poppet.

* * * * *